US010313947B1

(12) United States Patent
Sung et al.

(10) Patent No.: US 10,313,947 B1
(45) Date of Patent: Jun. 4, 2019

(54) SYSTEMS AND METHODS FOR LOAD BALANCING IN A WIRELESS COMMUNICATION NETWORK

(71) Applicant: Sprint Spectrum LP, Overland Park, KS (US)

(72) Inventors: Sanghoon Sung, Ashburn, VA (US); Pinal Tailor, Ashburn, VA (US); Dhaval Mehta, Aldie, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/716,935

(22) Filed: Sep. 27, 2017

(51) Int. Cl.
*H04W 36/22* (2009.01)
*H04W 24/08* (2009.01)
*H04L 12/26* (2006.01)

(52) U.S. Cl.
CPC ........... *H04W 36/22* (2013.01); *H04W 24/08* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 8,045,527 B2 | 10/2011 | Fan et al. | |
| 8,442,529 B2 | 5/2013 | Patil et al. | |
| 8,503,465 B2 | 8/2013 | Gogic | |
| 2008/0008203 A1* | 1/2008 | Frankkila | H04L 47/2416 370/412 |
| 2013/0315201 A1* | 11/2013 | May | H04W 36/023 370/331 |
| 2014/0362688 A1* | 12/2014 | Zhang | H04W 72/0486 370/230 |
| 2017/0105227 A1* | 4/2017 | Pinheiro | H04W 28/0263 |

* cited by examiner

*Primary Examiner* — Anh Ngoc M Nguyen (57) ABSTRACT

Systems and methods are described for handoff of a wireless device. A total delay budget may be configured to a first access node. Scheduler delays associated with each of multiple scheduling buffers can be measured. An average scheduling delay for multiple wireless devices may be calculated based on the measured scheduler delays. The average scheduling delay may be compared to the total delay budget for the first access node and, when the average scheduling delay exceeds the total delay budget, a second access node may be selected for offload of at least one wireless device of the multiple wireless devices.

11 Claims, 6 Drawing Sheets

SYSTEMS AND METHODS FOR LOAD BALANCING IN A WIRELESS COMMUNICATION NETWORK

TECHNICAL BACKGROUND

Wireless networks use various network links throughout the wireless network to communicate. For example, access nodes of the wireless network(s) may use network links to coordinate data packet transmissions with other access nodes, processing nodes, and/or wireless devices. Accordingly, these wireless networks rely on well-established network infrastructures and links to provide efficient communication services. In certain circumstances, portions of the wireless network(s) can experience high loading and/or poor channel conditions. For example, when wireless networks experience network overload conditions such as large amounts of data traffic (i.e., congestion) and/or high resource usage, the overall performance of the wireless network can deteriorate. In an effort to combat this deterioration, wireless networks may implement various load balancing techniques. But, these load balancing techniques often do not consider Quality of Service (QoS) metrics. Consequently, wireless device(s) of the wireless network may be unnecessarily moved from one access node and/or carrier band to another based on artificial congestion and/or resource usage.

OVERVIEW

Systems and methods are described for moving wireless devices from a first access node to a target access node. For example, in one embodiment, a delay budget may be configured at the first access node of the wireless network for multiple connected wireless devices. The first access node can assign buffers to each of the multiple wireless devices. On receipt of data packets at the buffer, a discard packet timer may be started. On expiration, the first access node can calculate a number of data packets remaining in the buffer. Based on the number of remaining data packets, the first access node can determine a queuing delay for the associated wireless device; the queuing delay is compared to an average queuing delay at the first access node. When the average queuing delay at the first access node is greater than (or exceeds) the configured delay budget for the first access node, the first access node selects a target access node for handoff of the multiple wireless devices. The average queuing delay at the selected target access node may be compared to the average queuing delay at the first access node. If the average queuing delay at the target access node is less than the average queuing delay at the first access node, the multiple wireless devices may be moved from the first access node to the selected target access node. Otherwise, the first access node re-selects a target access node. After the multiple wireless devices are moved to the selected target access node, the wireless network instructs the selected target access node to transmit data packets to the multiple wireless devices.

In another embodiment, systems and methods are described for handoff of a wireless device. For example, a target delay budget (or QoS threshold) can be configured at the first access node of the wireless network for a plurality of connected wireless devices. Each of the wireless devices may be assigned a buffer. A scheduling delay may be calculated (or measured) at each of the buffer(s) and an average scheduling delay may be calculated (or measured) for the first access node. The first access node compares the average scheduling delay at the first access node to the target delay budget (or QoS threshold). If the average scheduling delay at the first access node is less than the target delay budget (or QoS threshold), the first access node does not perform handoff of the plurality of wireless devices to a target access node. Alternatively, if the average scheduling delay at the first access node is greater than (or exceeds) the target delay budget (or QoS threshold), the first access node selects a target access node for handoff of the plurality of wireless devices. Once the target access node has been selected, the first access node compares a current delay at the target access node to the average scheduling delay at the first access node. If the current delay at the target access node is greater than (or exceeds) the average scheduling delay at the first access node, the first access node selects another target access node for handoff of the plurality of wireless devices. If the current delay at the target access node is less than the average scheduling delay at the first access node, the first access node instructs the plurality of wireless devices to collect measurement reports associated with the selected target access node. Based on the collected measurement reports, the first access node performs handoff of qualified wireless devices of the plurality of wireless devices to the selected target access node for load balancing of the wireless network.

In another embodiment, a total delay budget is configured for a plurality of connected wireless devices at the first access node. An average delay scheduling for the plurality of connected wireless devices is calculated at the first access node. The calculated average delay scheduling may be compared to the configured total delay budget. At least one wireless device of the plurality of wireless devices can be offloaded to a second access node when the calculated average delay scheduling is greater than the total delay budget for the plurality of wireless devices.

In yet another embodiment, a total delay budget may be configured for a first access node. The first access node may schedule buffers for each of multiple wireless devices connected to the first access node. A scheduler delay associated with each of the schedule buffers may be measured and, based on the measured scheduler delay(s), an average scheduling delay may be calculated for the multiple wireless devices. The average scheduling delay may be compared to the total delay budget for the first access node. When the average scheduling delay exceeds the total delay budget, a second access node may be selected for offload of at least one wireless device of the multiple wireless devices. The at least one wireless device may be instructed to measure indicators associated with the selected second access node. When the measured signal indicators meet a threshold level, the first access node may perform handoff of the at least one wireless device from the first access node to the second access node.

Systems and methods are described for triggering load balancing in a wireless network. For example, resources may be scheduled for multiple connected wireless devices at a scheduler of a first access node; the scheduler may assign scheduling buffer(s) per wireless device. A delay budget may be configured at the first access node for scheduling of the multiple wireless devices. The first access node may monitor an average delay associated with the scheduling buffer(s). Handoff of at least one wireless device of the multiple wireless devices may be performed from the first access node to a second access node when the average delay associated with the scheduling buffer(s) exceeds the delay budget for scheduling the multiple wireless devices.

Systems and methods are also described for detecting congestion in a wireless network. For example, a scheduling delay budget may be assigned for one or more connected wireless devices. A buffer wait time may be calculated at a first access node for each of the one or more connected wireless devices. An average scheduling delay may be calculated at the first access node for the connected wireless devices based on the calculated buffer wait time(s). Congestion at the first access node may be detected when the calculated average scheduling delay is greater than the scheduling delay budget.

DETAILED DESCRIPTION

Figure 1A:
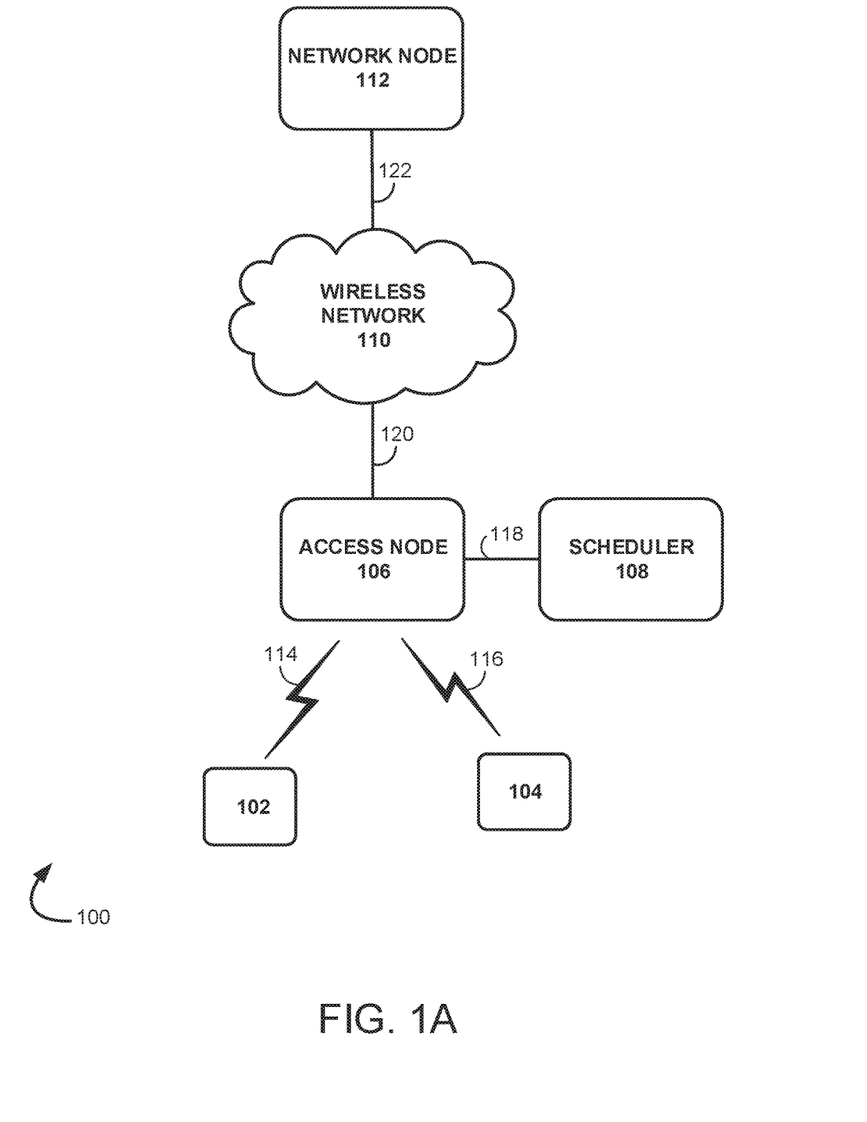
FIG. 1A illustrates an exemplary communication system for handoff of a wireless device operating in a wireless network.
Figure 1B:
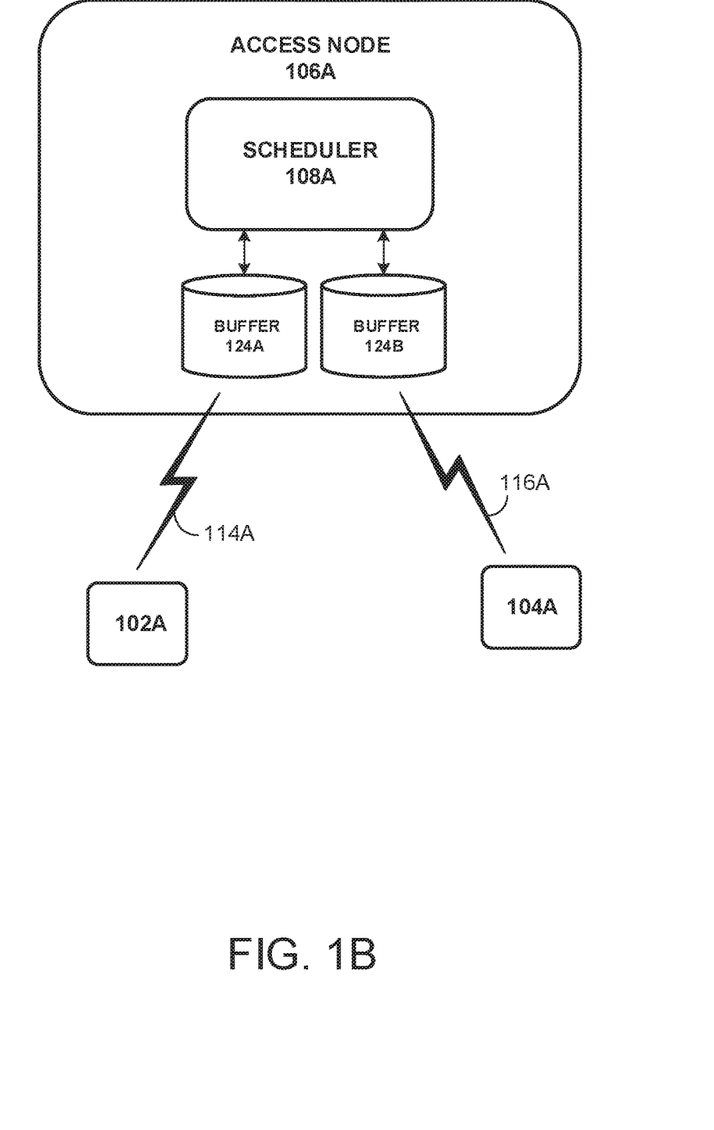
FIG. 1B illustrates an exemplary access node of the exemplary communication system illustrated in FIG. 1A.

FIGS. 1A and 1B illustrate an exemplary communication system 100 for handoff of wireless devices 102, 102A, 104, 104A operating in wireless network 110. In operation, a queuing delay at scheduler node or module 108, 108A and/or congestion at packet buffer(s) 124A, 124B of access node 106, 106A can occur due to, for example, data transmission errors (e.g., noise, interference, and/or fading) and/or packet loss. In an exemplary embodiment, data packets related to applications running on wireless devices 102, 102A, 104, 104A can be uploaded and downloaded from system 100 on respective UL and DL portions of communication links 114, 114A, 116, 116A via sub-layers of a user-plane protocol stack of system 100. For example, the data packets can be received at a Packet Data Compression Protocol (PDCP) layer of system 100. From the PDCP layer, the data packets are passed to a Radio Link Control (RLC) layer to be concatenated or segmented into a correct block size. The RLC layer forwards the concatenated data packets to the Media Access Control (MAC) layer for transmission by a Physical (PHY) layer of the user-plane protocol stack via access node 106, 106A and/or scheduler node or module 108, 108A based on a selected modulation and coding scheme (MCS).

In some instances, for example, due to data transmission errors and/or packet loss, the transmitted data packets can be subject to Hybrid Automatic Repeat Request (HARQ/ARQ) re-transmissions at the MAC sub-layer and/or RLC layer of the user-plane protocol stack for error recovery. When HARQ/ARQ is working for error recovery, a Round Trip Time (RTT) for the data packets, e.g., Transmission Control Protocol (TCP) RTT, increases and affects TCP throughput of system 100. This is, in part, because TCP throughput is inversely proportional to the RTT of the data packets.

Increased HARQ/ARQ re-transmissions results in queuing delay at access node 106, 106A and/or scheduler node or module 108, 108A due to increased signaling overhead and/or a bearer data load on, for example, the DL portion of communication links 114, 114A, 116, 116A, 118, 120, 122. In addition, HARQ/ARQ re-transmissions can increase congestion at the packet buffer(s) 124A, 124B or cause bottleneck at the PHY layer of system 100. Thus, systems and methods for decreasing queuing delay (e.g., through load balancing) at access node 106, 106A and/or scheduler node or module 108, 108 and/or congestion at packet buffer(s) 124A, 124B while maintaining a high bearer/link utilization rate is desirable. For example, it is desirable to determine an aggregated queuing delay for access node 106, 106A and/or scheduler node or module 108, 108A and an associated "back log" of data packets in the packet buffer(s) 124A, 124B and adapt, for example, load balancing techniques to account for actual network congestion and/or data load (e.g., not artificial congestion and/or resource usage detected based on static load thresholds used by typical load balancing techniques) on communication links 114, 114A, 116, 116A, 118, 120, 122 of system 100.

Communication system 100 can comprise wireless devices 102, 102A, 104, 104A, access nodes 106, 106A, scheduler node or module 108, 108A, network node 112, and wireless network 110. Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between access node 106, 106A and wireless network 110, which are omitted for clarity, including additional processing nodes, routers, gateways, and physical and/or wireless data links for carrying data among the various network elements.

Wireless devices 102, 102A, 104, 104A can be any device configured to communicate over system 100 using a wireless interface. For example, wireless devices 102, 102A, 104, 104A can include a cell phone, a smart phone, a computing platform such as a laptop, a palmtop, or a tablet, a personal digital assistant (PDA), an internet access device, and combinations thereof. It is noted that while two wireless devices 102, 102A, 104, 104A are illustrated in FIGS. 1A and 1B as being in communication with access node 106, 106A, any number of wireless devices can be implemented according to various exemplary embodiments disclosed herein.

Access node 106, 106A can be any network node capable of providing wireless communications to wireless devices 102, 102A, 104, 104A, and can be, for example, a base transceiver station, a radio base station, a NodeB device, or an enhanced eNodeB device. Access node 106, 106A can include a scheduler module, illustrated in FIG. 1B, or can be in communication with scheduler node 108 through communication link 118. Access node 106, 106A may utilize the scheduler module and/or scheduler node 108, 108A to coordinate transmissions of wireless resources (e.g., the next available physical resource blocks, wireless spectrum, etc.) among connected wireless devices, for example, wireless devices 102, 102A, 104, 104A. The scheduler module and/or scheduler node 108, 108A can collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 102, 102A, 104, 104A at access node 106, 106A. Access node 106, 106A via the scheduler module or scheduler node 108, 108A can distribute the wireless resources via a scheduling algorithm to wireless devices 102, 102A, 104, 104A based on the collected characteristics.

Access nodes 106, 106A can comprise a processor and associated circuitry to execute or direct the execution of computer-readable instructions to obtain information. Access nodes 106, 106A can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 106, 106A can receive instructions and other input at a user interface. Although only one access node 106, 106A is illustrated in FIGS. 1A and 1B, wireless devices 102, 102A, 104, 104A can be in communication with a plurality of access nodes. The plurality of access nodes can be associated with different networks and can support different communication protocols and radio access technologies.

Wireless network 110 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 110 can be capable of carrying data, for example, to support voice, push-to-talk, broadcast video, and data communications by a wireless device, for example, wireless devices 102, 102A, 104, 104A. Wireless network protocols can comprise Code Division Multiple Access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 110 can also comprise additional base stations, controller nodes, telephony switches, internet routers, network gateways, computer systems, communication links, or some other type of communication equipment, and combinations thereof.

Network node 112 can be any network node configured to communicate information and/or control information over system 100. For example, network node 112 can receive and/or transmit information to/from wireless devices 102, 102A, 104, 104A over system 100. While network node 112 is shown in the backhaul of system 100, network node 112 could alternatively be located between access node 106, 106A and wireless network 110. Network node 112 can be a standalone computing device, computing system, or network component, and can be accessible, for example, by a wired or wireless connection, or through an indirect connection such as through a computer network or wireless network. For example, network node 112 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 112 is not limited to any specific technology architecture, such as LTE, and can be used with any network architecture and/or protocol.

Communication links 114, 114A, 116, 116A, 118, 120, 122 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 114, 114A, 116, 116A, 118, 120, 122 can be a radio frequency, microwave, infrared, or other similar signal, and can use a suitable communication protocol, for example, GSM, CDMA, WiMAX, LTE, or combinations thereof. Other wireless protocols can also be used. Links 114, 114A, 116, 116A, 118, 120, 122 can be a direct link or might include various equipment, intermediate components, systems, and networks.

Figure 2:
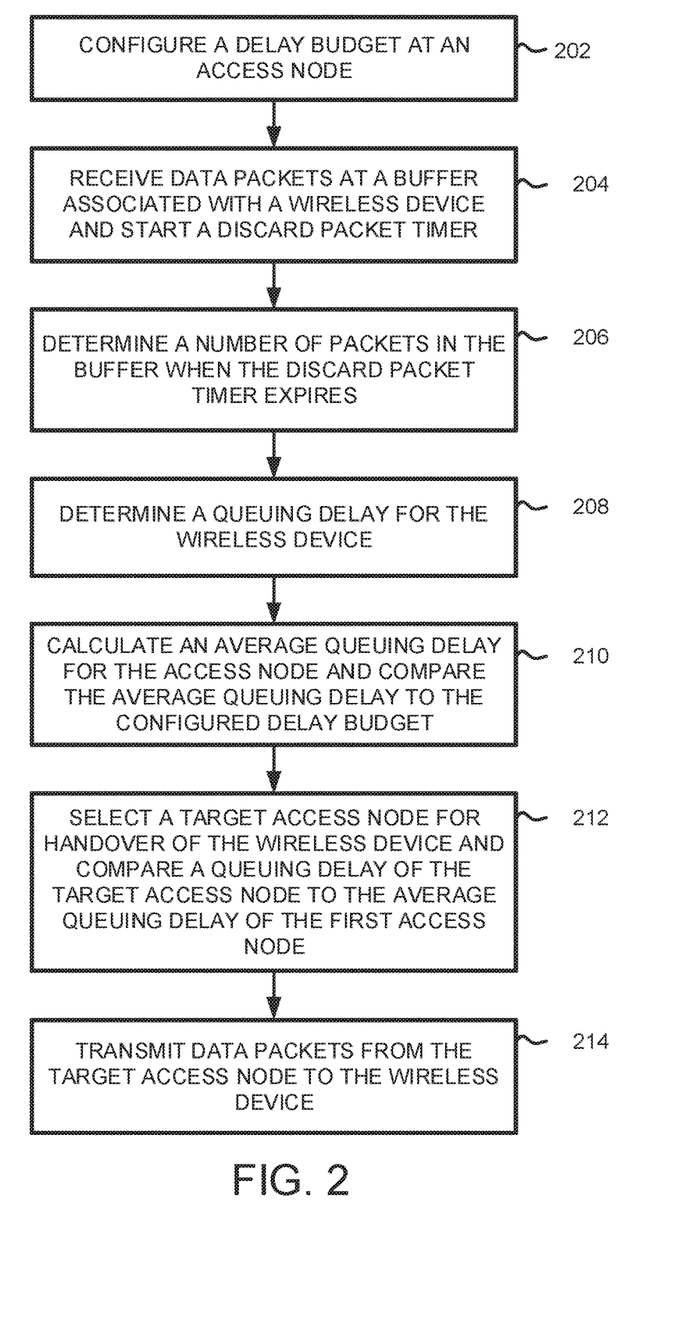
FIG. 2 illustrates an exemplary method for handoff of a wireless device operating in a wireless network.

FIG. 2 illustrates an exemplary method for handoff of a wireless device operating in a wireless network. The method of FIG. 2 will be discussed with reference to the exemplary system 100 illustrated in FIG. 1A and the exemplary access node illustrated in FIG. 1B. But, the exemplary method for handoff of a wireless device illustrated in FIG. 2 can be implemented with any suitable communication system. In addition, although FIG. 2 depicts steps performed in a particular order or arrangement, one skilled in the art, using the disclosure provided herein, will appreciate that various steps of the method can be omitted, rearranged, combined, and/or adapted in various ways.

Referring to FIG. 2, at steps 202-208, the wireless network configures a delay budget for access node(s) of the wireless network based on, for example, historical delay at the access node(s). For example, the wireless network 110 may consider historical usage data and/or reported delay at access node 106, 106A and, based on the historical usage data and/or reported delay, configure a delay budget for wireless devices 102, 102A, 104, 104A connected to access node 106, 106A. After the delay budget has been configured at access node 106, 106A, the access node 106, 106A can track packets lost due to, for example, data transmission errors (e.g., noise, interference, and/or fading) and/or other packet loss at packet buffers 124A, 124B of access node 106, 106A. The packet buffers 124A, 124B of access node 106, 106A can each be associated (or assigned) with a wireless device 102A, 102B, as illustrated in FIG. 1B. The packet buffers 124A, 124B can include a discard packet timer that is started at access node 106, 106A on receipt of a new data packet at the packet buffer 124A, 124B. The discard packet timer can be used by access node 106, 106A and/or wireless network 110 to determine a queuing delay for the associated wireless device 102A, 102B. For example, in one embodiment, the wireless network 110 and/or access node 106, 106A sets a value for the discard packet timer based on Quality of Service (QoS) and/or Channel Quality Indicators (CQIs) of applications running on the wireless device 102, 102A, 104, 104A. When the discard packet timer is "stopped" or expires, a packet buffer delay or queuing delay (e.g., a period of time from receipt of the new data packet at the packet buffer 124A, 124B until receipt of the data packet at a transmitter) associated with the new data packet and a residual number of data packets in the packet buffer 124A, 124B can be calculated for the associated wireless device 102, 102A, 104, 104A.

At 210, the wireless network and/or access node calculates an average (or aggregates) queuing delay or packet buffer delay for the access node. For example, wireless network 110 and/or access node 106, 106A collects queuing delay(s) or packet buffer delay(s) at packet buffers 124A, 124B associated with wireless devices 102, 102A, 104, 104A and calculates an average queuing delay or packet buffer delay for access node 106, 106A. Wireless network 110 and/or access node 106, 106A compares the calculated average queuing delay or packet buffer delay for access node 106, 106A to the configured delay budget for access node 106, 106A.

At 212, the wireless network and/or access node of the wireless network selects a target access node for handover of wireless devices of the wireless network and compares a queuing delay or packet buffer delay of the target access node to the average queuing delay or packet buffer delay at access node 106, 106A. For example, when the calculated average queuing delay or packet buffer delay for access node 106, 106A is greater than (or exceeds) the configured delay budget for access node 106, 106A, wireless network 110 may instruct the access node 106, 106A and/or connected wireless devices 102, 102A, 104, 104A to report target access nodes for handover of the connected wireless devices 102, 102A, 104, 104A. The wireless network 110 and/or access node 106, 106A may instruct the selected target access nodes to report a current, average queuing delay of the target access node(s) at access node 106, 106A. Access node 106, 106A compares the reported average queuing delay of the target access node to the average queuing delay at access node 106, 106A.

At 214, the wireless network and/or access node of the wireless network performs handover of the wireless devices to the target access node and instructs the target access node to transmit data packets to the wireless devices. For example, when the reported average queuing delay of the selected target access node is greater than (or exceeds) the average queuing delay at access node 106, 106A, the wireless network 110 instructs the access node 106, 106A and/or connected wireless devices 102, 102A, 104, 104A to re-select target access nodes for handover of the connected wireless devices 102, 102A, 104, 104A. Alternatively, when the reported average queuing delay of the selected target access node is less than the average queuing delay at access node 106, 106A, the wireless network 110 instructs the access node 106, 106A to perform and handover of wireless devices 102, 102A, 104, 104A connected to the access node 106, 106A to the selected target access node to balance the load at access node 106, 106A. After handover of the wireless devices 102, 102A, 104, 104A, the selected target access node may be instructed to transmit data packets to the wireless devices 102, 102A, 104, 104A.

Figure 3:
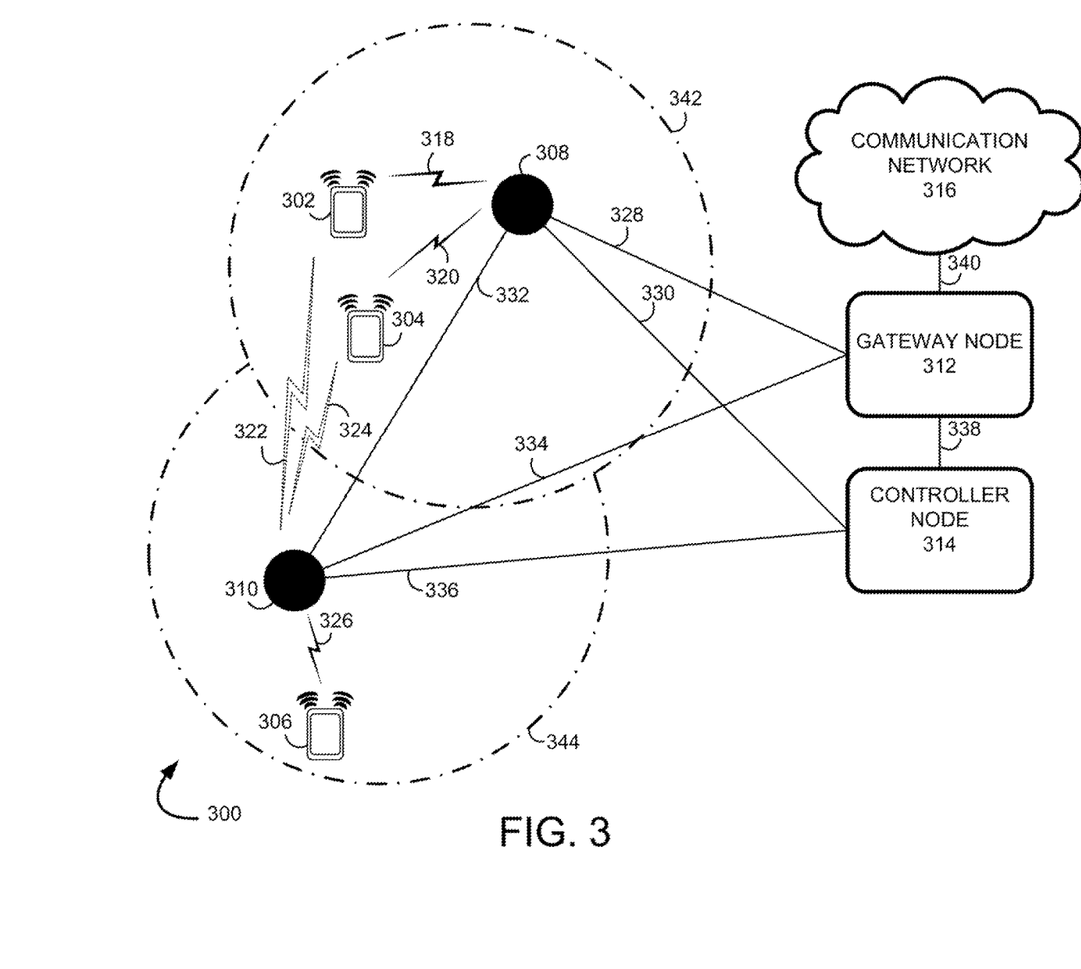
FIG. 3 illustrates another exemplary communication system for handoff of a wireless device operating in a wireless network.

FIG. 3 illustrates another exemplary communication system 300 for handoff of a wireless device operating in a wireless network. System 300 can comprise wireless devices 302, 304, 306, access nodes 308, 310 (which can include data schedulers), gateway node 312, controller node 314, and wireless network 316. A scheduler node (not shown) can be included in the backhaul of system 300. The communications between the wireless devices 302, 304, 306 can be relayed, monitored, inspected, and/or scheduled by an inspection module or node (not shown) at access nodes 308, 310 and/or a data scheduler or scheduler node (not shown).

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between wireless devices 302, 304, 306, access nodes 308, 310, etc., and wireless network 316.

Wireless devices 302, 304, 306 can be any device configured to communicate over system 300 using a wireless communication link or interface. Wireless devices 302, 304, 306 can include a cell phone, a smart phone, a computing platform such as a laptop, a palmtop, or a tablet, a PDA, an internet access device, and combinations thereof. A wireless interface of wireless devices 302, 304, 306 can include one or more transceivers for transmitting and receiving data over system 300. Each transceiver can be associated with the same or different frequency bands, the same or different radio access technologies, the same or different network providers (or network operators), and/or the same or different services. For example, wireless devices 302, 304, 306 can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302, 304, 306 can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302, 304, 306 can be connected with access nodes 308, 310 through communication links 318, 320, 326. Links 318, 320, 326 can use various communication media, such as air, space, metal, optical fiber, or some other signal propagation path—including combinations thereof. Links 318, 320, 326 may comprise many different signals sharing the same link. Links 318, 320, 326 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304, 306 and access nodes 308, 310 could share the same representative wireless link, but be transferred over different communication sessions, frequencies, timeslots, packets, ports, sockets, logical transport links, or in different directions—including combinations thereof.

Access nodes 308, 310 can be any network node configured to provide communication between wireless devices 302, 304, 306 and wireless network 316. Access nodes 308, 310 can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 308, 310 can use data scheduler(s) and/or coordinate with a scheduler node (not shown) to communicate scheduling decisions (e.g., UL/DL scheduling assignments) to wireless devices 302, 304, 306 using control information carried by an UL/DL control channel.

Access nodes 308, 310 can comprise a processor and associated circuitry to execute or direct the execution of computer-readable instructions to obtain information. Access nodes 308, 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 308, 310 can receive instructions and other input at a user interface.

Gateway node 312 can be any network node configured to interface with other network nodes using various protocols. Gateway node 312 can communicate user data over system 300. Gateway node 312 can be a standalone computing device, computing system, or network component, and can be accessible, for example, by a wired or wireless connection, or through an indirect connection such as through a computer network or communication network. For example, gateway node 312 can include a Serving Gateway (SGW) and/or a Packet Data Network Gateway (PGW), etc. One of ordinary skill in the art would recognize that gateway node 312 is not limited to any specific technology architecture, such as LTE, and can be used with any network architecture and/or protocol. Moreover, while one gateway node 312 is illustrated in FIG. 3 as being in communication with wireless network 316, one of ordinary skill in the art would recognize that multiple gateway nodes could be in communication with wireless network 316.

Gateway node 312 can comprise a processor and associated circuitry to execute or direct the execution of computer-readable instructions to obtain information. Gateway node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 312 can receive instructions and other input at a user interface.

Controller node 314 can be any network node configured to communicate information and/or control information over system 300. Controller node 314 can be configured to transmit control information associated with a handover procedure. Controller node 314 can be a standalone computing device, computing system, or network component, and can be accessible, for example, by a wired or wireless connection, or through an indirect connection such as through a computer network or communication network. For example, controller node 314 can include a MME, a HSS, a PCRF, an AAA node, a RMS, a SPS, a policy server, etc. One of ordinary skill in the art would recognize that controller node 314 is not limited to any specific technology architecture, such as LTE and can be used with any network architecture and/or protocol. Moreover, while one controller node is illustrated in FIG. 3 as being in communication with wireless network 316, one of ordinary skill in the art would recognize that multiple controller nodes could be in communication with wireless network 316.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 314 can receive instructions and other input at a user interface.

Access node 308 can be in communication with gateway node 312 through communication link 328 and with controller node 314 through communication link 330. Access node 308 can be in communication with access node 310 through communication link 332. Access node 310 can be in communication with gateway node 312 through communication link 334 and with controller node 314 through communication link 336. Gateway node 312 can be in communication with controller node 314 through communication link 338 and with wireless network 316 through communication link 340. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless network 316 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 316 can be capable of carrying data, for example, to support voice, PTT, broadcast video, and data communications by a wireless device such as wireless devices 302, 304, 306. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless network 316 comprise Ethernet, Fast Ethernet, Gigabit Ethernet, Local Talk (such as Carrier Sense Multiple Access with Collision Avoidance), Token Ring, FDDI, ATM. Wireless network 316 can also comprise additional base stations, controller nodes, telephony switches, internet routers, network gateways, computer systems, communication links, or some other type of communication equipment, and combinations thereof.

Figure 4:
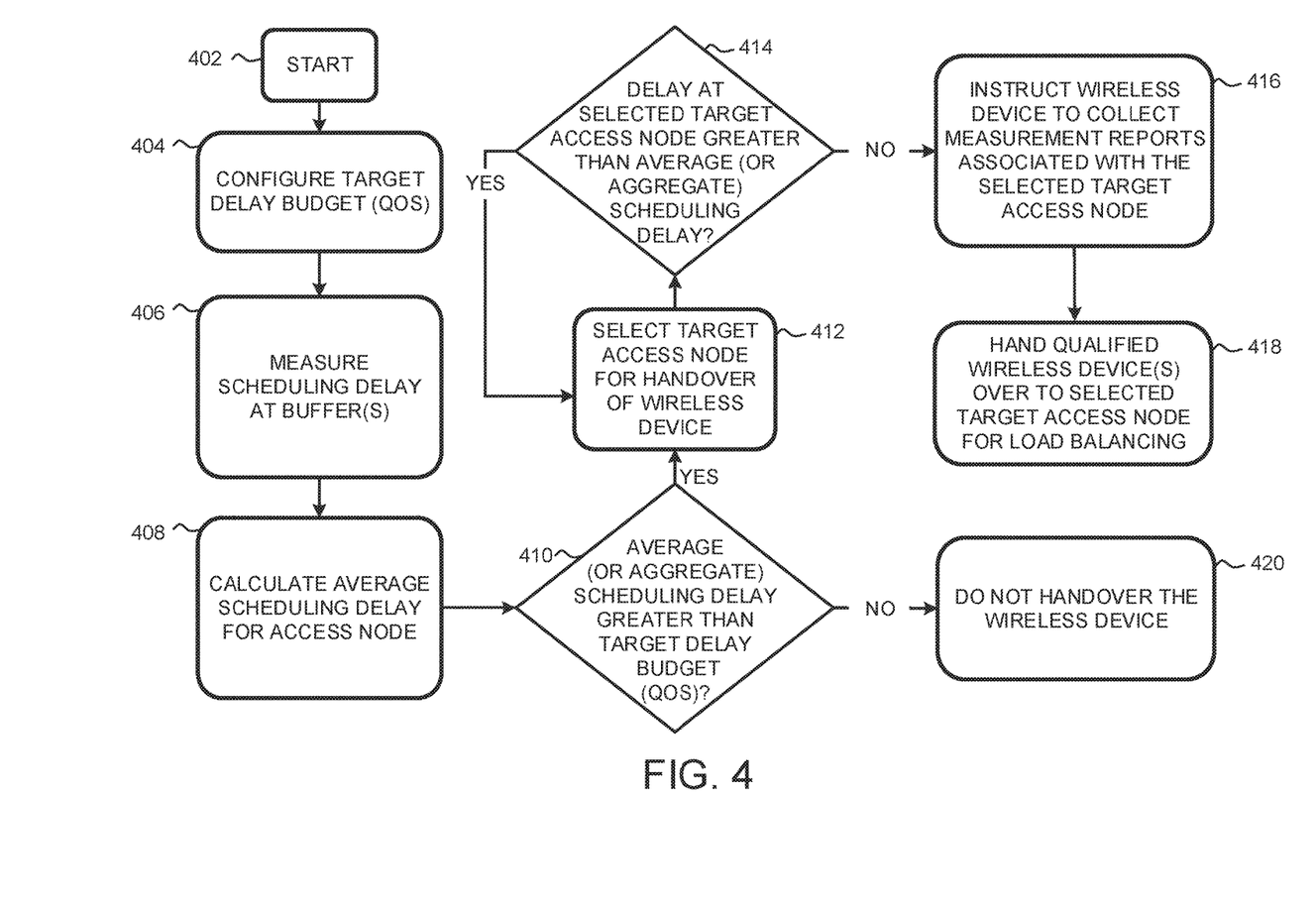
FIG. 4 illustrates an exemplary flow chart for handoff of a wireless device operating in a wireless network.

FIG. 4 illustrates an exemplary flow chart for handoff of a wireless device operating in a wireless network. The method of FIG. 4 will be discussed with reference to the exemplary system 300 illustrated in FIG. 3. But, the exemplary flow chart for handoff illustrated in FIG. 4 can be implemented with any suitable communication system. In addition, although FIG. 4 depicts steps performed in a particular order or arrangement, one skilled in the art, using the disclosure provided herein, will appreciate that various steps of the method can be omitted, rearranged, combined, and/or adapted in various ways.

Referring to FIG. 4, at 402 and 404, the wireless network 316 and/or access nodes 308, 310 start (or implement) load balancing techniques. For example, at 404, wireless network 316 and/or access nodes 308, 310 may configure a target delay budget for access node 308, 310. The target delay budget for access node 308, 310 includes a value for a discard packet timer(s) of packet buffer(s) of the access node 308, 310; the discard packet timer value for each packet buffer can be set based on QoS and/or QCIs of applications running on, for example, a wireless device 302, 304, 306 associated with the packet buffer. Each packet buffer can be associated with a single wireless device 302, 304, 306 and/or with multiple wireless devices 302, 304, 306 connected to access node 308, 310. In addition, the QoS and/or CQIs for each wireless device 302, 304, 206 can be used to differentiate priorities of services flows and to determine access node specific parameters, such as link layer configuration, scheduling weights, and queue management. For example, QCI can comprise guaranteed bit rate (GBR) indications and non-guaranteed bit rate (non-GBR) indications and load on links 318, 320, 326, 328, 330, 332, 334, 336, 338, 340 of system 300 can be determined for a particular traffic type indicator.

At 406, the wireless network and/or access nodes measure an actual scheduling delay at packet buffers of the access nodes associated with the wireless devices. For example, data packets are received at a packet buffer(s) of access node 308, 310 and a discard packet timer (e.g., a latency timer) is started. When the discard packet timer is "stopped" or expires, a queuing delay or buffer delay (e.g., the period of time from receipt of the new data packet at the packet buffer until receipt at a transmitter) is calculated. The queuing delay or buffer delay can be calculated for each packet buffer associated with the wireless devices 302, 304, 206 at the access node 308, 310; each packet buffer can be associated with a single wireless device 302, 304, 306 and/or with multiple wireless devices 302, 304, 306 connected to access node 308, 310.

At 408, the wireless network and/or access nodes can calculate an average scheduling delay for the access node. For example, wireless network 316 and/or access node 308, 310 collects queuing delay(s) or packet buffer delay(s) at packet buffers associated with wireless devices 302, 304, 306 and calculates an average queuing delay or packet buffer delay for access node 308, 310.

At 410, the wireless network and/or access nodes compare the average queuing delay or packet buffer delay calculated at step 408 for access node 308, 310 to the target delay budget configured for access node 308, 310 at step 404. When the calculated average queuing delay or packet buffer delay for access node 308, 310 is less than (or does not meet a threshold packet buffer delay) the configured target delay budget for access node 308, 310, at step 420 the wireless network 316 and/or access node 308, 310 do not perform a handoff of wireless devices 302, 304, 306 to a target access node 308, 310. If, however, the calculated average queuing delay or packet buffer delay for access node 308, 310 is greater than (or exceeds) the configured target delay budget for access node 308, 310, wireless network 316 instructs the access node 308, 310 and/or wireless devices 302, 304, 306 to report target access nodes for handoff of wireless devices 302, 304, 306 at step 412.

At 414, the wireless network 316 and/or access node 308, 310 may instruct target access nodes 308, 310 selected at step 412 to report a current queuing delay or packet buffer delay of the target access node 308, 310 at access node 308, 310. Wireless network 316 and/or access node 308, 310 compares the reported queuing delay or packet buffer delay to the average (or aggregate) queuing delay or packet buffer delay of access node 308, 310 calculated at step 408. When the reported queuing delay or packet buffer delay for the selected target access node 308, 310 is greater than (or exceeds) the average queuing delay or packet buffer delay of access node 308, 310 calculated at step 408, the wireless network 316 instructs the access node 308, 310 and/or connected wireless devices 302, 304, 306 at step 412 to re-select target access nodes 308, 310 for handoff of the wireless devices 302, 304, 306. If, however, the reported queuing delay or packet buffer delay for the selected target access node 308, 310 is less than the average queuing delay or packet buffer delay of access node 308, 310 calculated at step 408, the wireless network 316 via access node 308, 310 instructs connected wireless devices 302, 304, 306 to collect measurement reports associated with the selected target access node 308, 310 at step 416.

At step 418, the wireless network and/or access node performs handoff of qualified wireless devices to the selected target access node. For example, based on the measurement reports collected from wireless devices 302, 304, 306 at step 416, the wireless network 316 selects wireless devices that meet a criteria (i.e., qualified wireless devices) for handoff to the selected target access node 308, 310. The wireless network 316 instructs access node 308, 310 to perform handoff of the qualified wireless 302, 304 to the selected target access node 308, 310 to balance load at access node 308, 310. After handoff of the qualified wireless devices 302, 304, the selected target access node 308, 310 can be instructed to transmit data packets to connected wireless devices 302, 304, 306.

Figure 5:
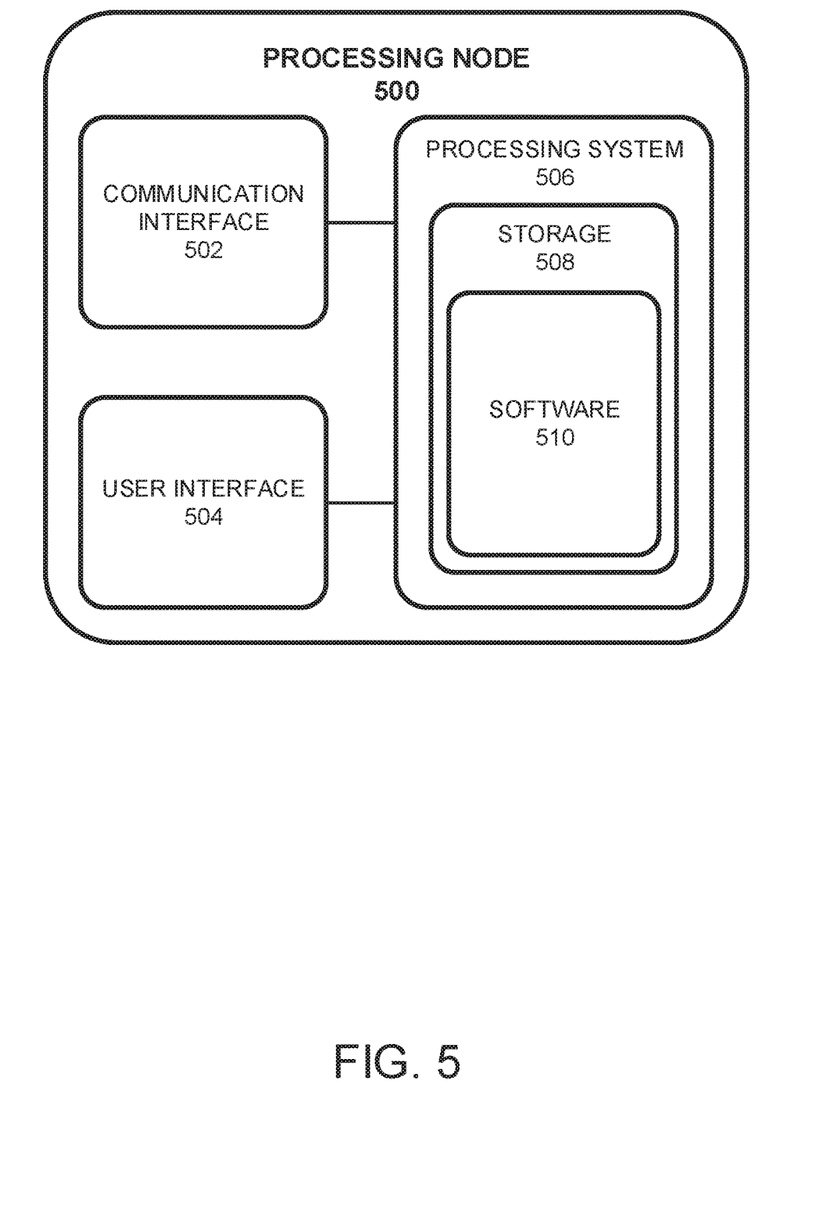
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 106, 106A, 308, 310, network node 112, gateway node 310, 312, and controller node 314. Processing node 500 can also be an adjunct or component of a network element, such as an element of access nodes 106, 106A, 308, 310, network node 112, gateway node 310, 312, and controller node 314. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for managing congestion in a wireless network, the method comprising:
    assigning, by a first access node, a scheduling delay budget for one or more wireless devices;
    calculating, at the first access node, a buffer wait time for each of the one or more wireless devices;
    calculating, at the first access node, an average scheduling delay for the access node based on the calculated buffer wait times; and
    performing handoff of at least one wireless device of the one or more wireless devices from the first access node to a second access node when the average scheduling delay associated with the scheduling buffers exceeds the scheduling delay budget for scheduling the one or more wireless devices.

2. The method of claim 1, wherein the assigned scheduling delay budget is assigned based on historical delay at the first access node.

3. The method of claim 1, wherein the buffer wait time for each of the one or more connected wireless devices is calculated using a discard packet timer.

4. The method of claim 3, wherein each of the one or more connected wireless devices is associated with a packet buffer of the access node.

5. The method of claim 3, wherein the access node sets a value for the discard packet timer based on Quality of Service (QoS) and/or Channel Quality Indicators (CQIs) of applications running on the wireless device.

6. A system for managing congestion in a wireless network, the system comprising:
    a processing node at a first access node configured to:
        assign a scheduling delay budget for one or more wireless devices;
        calculate a buffer wait time for each of the one or more wireless devices;
        calculate an average scheduling delay for the access node based on the calculated buffer wait times; and
        performing handoff of at least one wireless device of the one or more wireless devices from the first access node to a second access node when the average scheduling delay exceeds the scheduling delay budget for scheduling the one or more wireless devices.

7. The system of claim 6, wherein the assigned scheduling delay budget is assigned based on historical delay at the first access node.

8. The system of claim 6, wherein the buffer wait time for each of the one or more connected wireless devices is calculated using a discard packet timer.

9. The system of claim 8, wherein each of the one or more connected wireless devices is associated with a packet buffer of the access node.

10. The system of claim 8, wherein the access node sets a value for the discard packet timer based on Quality of Service (QoS) and/or Channel Quality Indicators (CQIs) of applications running on the wireless device.

11. A method for managing congestion in a wireless network, the method comprising:
    scheduling, at a scheduler of a first access node, resources for multiple wireless devices, wherein the scheduler assigns a scheduling buffer per wireless device;
    configuring, at the first access node, a delay budget for scheduling the multiple wireless devices;
    monitoring, at the first access node, an average delay associated with the scheduling buffers; and
    performing handoff of at least one wireless device of the multiple wireless devices from the first access node to a second access node when the average delay associated with the scheduling buffers exceeds the delay budget for scheduling the multiple wireless devices.

* * * * *